United States Patent
Kritchman

(10) Patent No.: US 7,962,237 B2
(45) Date of Patent: Jun. 14, 2011

(54) METHOD AND APPARATUS FOR OPTIMIZING A SCANNING PLAN IN THREE-DIMENSIONAL PRINTING

(75) Inventor: Eliahu M. Kritchman, Tel Aviv (IL)

(73) Assignee: Objet Geometries Ltd., Rehovot (IL)

( * ) Notice: Subject to any disclaimer, the term of this patent is extended or adjusted under 35 U.S.C. 154(b) by 272 days.

(21) Appl. No.: 12/186,544

(22) Filed: Aug. 6, 2008

(65) Prior Publication Data

US 2010/0033521 A1    Feb. 11, 2010

(51) Int. Cl.
G06F 19/00    (2011.01)
B41J 29/38    (2006.01)
B41J 2/435    (2006.01)
G06G 7/48    (2006.01)

(52) U.S. Cl. .............. 700/119; 703/6; 347/5; 347/8; 347/9; 347/237

(58) Field of Classification Search .............. 347/5, 9, 347/237, 8; 700/119; 703/6
See application file for complete search history.

(56) References Cited

U.S. PATENT DOCUMENTS

| | | | |
|---|---|---|---|
| 5,260,009 A * | 11/1993 | Penn | 264/401 |
| 5,594,652 A * | 1/1997 | Penn et al. | 700/119 |
| 6,259,962 B1 * | 7/2001 | Gothait | 700/119 |
| 6,523,921 B2 * | 2/2003 | Codos | 347/8 |
| 6,813,594 B2 * | 11/2004 | Guertin et al. | 703/6 |
| 6,940,037 B1 * | 9/2005 | Kovacevic et al. | 219/121.64 |
| 7,209,797 B2 * | 4/2007 | Kritchman et al. | 700/118 |
| 7,500,846 B2 * | 3/2009 | Eshed et al. | 425/375 |
| 7,658,976 B2 * | 2/2010 | Kritchman | 427/427.3 |
| 7,689,314 B2 * | 3/2010 | Silverbrook | 700/119 |
| 2010/0121476 A1 * | 5/2010 | Kritchman | 700/119 |

OTHER PUBLICATIONS

Jun et al., "Development of Pattern Driver for Piezo Nozzle Control of Multi-Priint Head in 3D SFFS Using UV Resin", 2007 SICE Annual Conference, p. 1639-1643.*

* cited by examiner

*Primary Examiner* — Albert Decady
*Assistant Examiner* — Thomas Stevens
(74) *Attorney, Agent, or Firm* — Pearl Cohen Zedek Latzer, LLP

(57) ABSTRACT

Embodiments of the present invention may include a method for printing three-dimensional objects, layer by layer utilizing an optimized scheme of predefined passes for each layer based on considerations related to both throughput and quality of printing. Embodiment of the invention may include generating a scanning plan for a layer such that the accumulated length for all the scanning passes in the layer is minimized. The optimization scheme may be performed based on image data parameters, such as sizes, locations, dimensions and shapes of the imaged areas of the layer.

14 Claims, 6 Drawing Sheets

METHOD AND APPARATUS FOR OPTIMIZING A SCANNING PLAN IN THREE-DIMENSIONAL PRINTING

BACKGROUND OF THE INVENTION

Three-dimensional solid freeform fabrication (SFF) processes for building three-dimensional (3D) objects, layer by layer, such as three-dimensional printing, are inherently slow processes. In three-dimensional printing material is selectively jetted from one or more printing heads and deposited onto a fabrication tray in consecutive layers according to a pre-determined configuration as defined by a Computer Aided Design (CAD) system connected to the printing machinery.

In some 3D printing machines, the size of printing head is smaller than the width and length of the fabrication tray. Therefore, to print a single layer, the printing head is designed to scan the tray in a number of passes until the whole tray is scanned. There is a need to optimize the scanning plan in order to minimize printing time, improve quality and reduce the cost of 3D printing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1A:
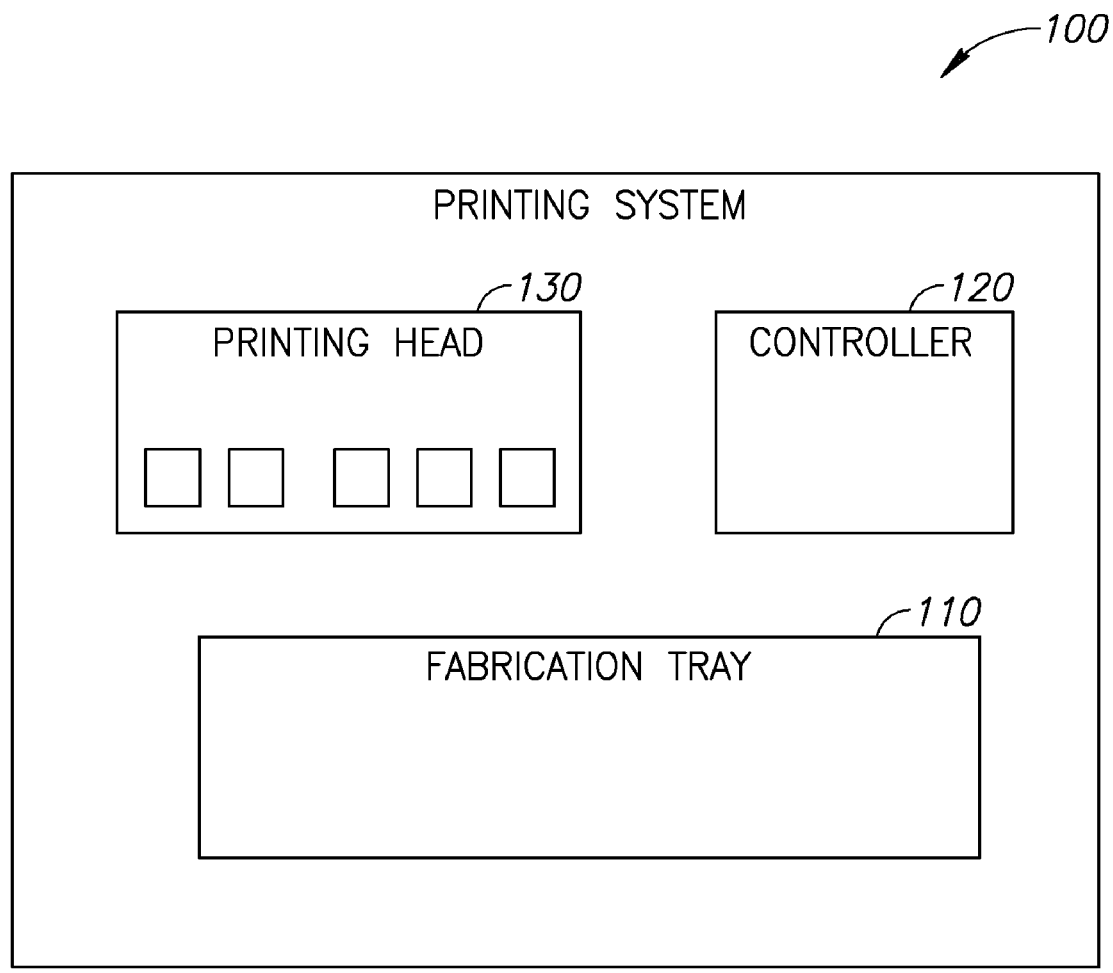
FIG. 1A is a high level block diagram of an exemplary inkjet printing system according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Some embodiments of the present invention may be implemented in software for execution by a processor-based system. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

The terms "layer" and "object layer" are used throughout the specification and claims to describe any lamina or film that may represent a cross-section or slice of a 3D object. A layer may be formed and adhered to previously formed and adhered layers in a "layer by layer" fashion to create, build up or form a 3D object.

The terms "X direction", "X" and "scanning direction" as used throughout the specification and claims refers to the direction of relative movement between a dispensing head (printing head) and a fabrication tray during selecting dispensing of material from nozzles of the dispensing head onto the fabrication tray. The relative movement may be achieved by moving the dispensing head while the tray is kept motionless, by moving the fabrication tray while keeping the dispensing head motionless or by moving both the printing head and the fabrication tray. For example, movement of the printing head from one side of the fabrication tray to the other is referred to as "scanning pass". For ease of explanation the description below illustrates a system and method where the printing head moves and the tray is still, but it should be understood to a person skilled in the art that embodiments of the invention are likewise applicable to any relative movements between a printing head and a fabrication tray.

The terms "Y direction", "Y" and "indexing direction" as used herein throughout the specification and claims refers to a direction perpendicular to the scanning direction. The indexing direction is the direction of relative movement between the dispensing head (printing head) and a fabrication tray between one scanning pass and the subsequent scanning pass.

Embodiments of the present invention may include a method for printing three-dimensional objects, layer by layer utilizing an optimized predefined scheme of passes (a scanning plan) for each layer based on considerations related to both throughput and quality of printing. The term "predefined scheme" refers to a scheme or scanning plan that is generated and stored prior to printing in contrast to "on-the-fly", which refers to computing or determining the scanning passes during printing. Embodiment of the invention may include generating a scanning plan for a layer such that the accumulated length for all the scanning passes in the layer is minimized. The optimization scheme may be performed based on image data parameters, such as sizes, locations, dimensions and shapes of the imaged areas of the layer.

According to some embodiments, the method may include selectively depositing material from a printing head in two or more scanning passes to form a layer of a three-dimensional object. The first scanning pass forms a first imaged area on the layer and the second scanning pass forms a second imaged area on the layer, which do not overlap the first imaged area. According to embodiments of the invention in order to minimize the scanning time for a single layer, the second scanning pass partially overlaps the first scanning pass. The partial overlapping may occur when the printing head is moved in a direction substantially perpendicular to the scanning direction, after the first scanning pass is completed, a distance which is smaller than the distance between the first and last nozzle of the printing head.

Reference is now made to FIG. 1A, which is a high level block diagram of an inkjet printing system according to embodiments of the invention. A printing apparatus 100 may include a fabrication platform or tray 110 and a printing head 130. Fabrication tray 110 may include a horizontal surface to carry material dispensed from printing head 130. Printing head 130 may be, for example, an inkjet head having a plurality of dispensing nozzles arranged in an array of one or more rows along the longitudinal axis of the printing head. The printing head may be located such that its longitudinal axis is substantially parallel to the indexing direction. According to embodiments of the invention, the effective size, which is determined by the location of the nozzles, in both the X and Y dimension may be smaller that the dimensions of the Fabrication tray. Printing head 130 may be coupled to a conveyance unit (not shown) to allow printing head 130 to move or slide across fabrication tray 110 in both X and Y directions.

System 100 may further include a controller 120, such as a microprocessor to control the printing process including the movement of printing head 130 according to a pre-defined scanning plan as described in detail below. The passage of printing head 130 in the X and Y directions may be according to a pre-defined, or a pre-planned program, for example, CAD configuration which may be converted, for example, to a Stereo Lithography (STL) format and may be programmed into the controller. Other programs, configurations and methods which may comprise any data format may be used in order to control the printing process. Accordingly, Controller 120 may include storage medium having stored thereon instructions including scanning plans which can be used to as instructions for printing head 130 to perform movements in the X and Y direction.

Printing head 130 may include a plurality of jetting nozzles, for example nozzles 131, 132, 133, 134 and 135. For clarity and ease of explanation five nozzles are illustrated, however embodiments of the invention are likewise applicable to any number of nozzles. Jetting nozzles 131-135 may dispense material onto fabrication tray 110 to create the layers representing cross sections of the three-dimensional object. Although in the exemplary illustrations of FIG. 1A, a single printing head is illustrated, it should be understood to a person skilled in art that the invention is not limited in this respect and according to embodiments of the present invention any suitable numbers of printing heads may be used.

Printing head 130 may scan or move across fabrication tray 110 along the X axis in a predefined number of passes, stripes or bands. A pass may include movement of printing head 130 from one side of fabrication tray 110 to the other side covering the entire width (length) of the tray or movement in the X direction that covers only a portion of the tray. In conventional 3D printing systems, the length of all the passes, in the X direction is designed to be substantially equal to the dimension of fabrication tray 101 in the X direction, the width of each pass along Y axis is equal the applicable length of printing head 130, and the starting position of the printing head in the X direction above tray 110 is the same for the passes for all the layers.

As the length of printing head 130 in the Y direction, defined by the distance between a edge nozzles along the longitudinal axis of the head, may be less than the length of fabrication tray 110 in Y direction, in order to scan the entire area of fabrication tray 110 more that one scanning pass may be required. The printing head 130 may move according to instructions from controller 120 along the indexing direction Y to re-position printing head 130 to the starting point of each subsequent scanning pass.

Figure 1B:
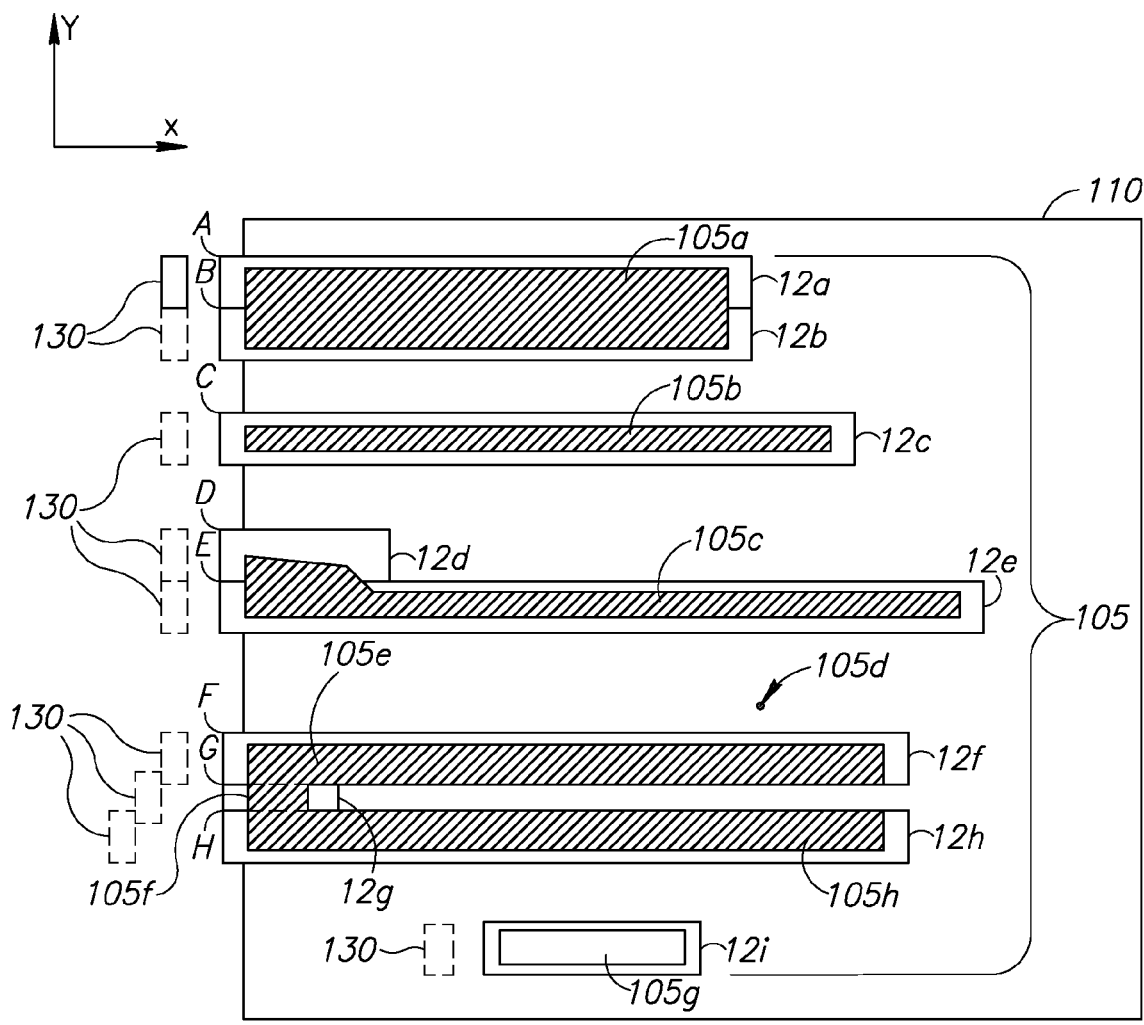
FIG. 1B is an illustration of a scanning plan of an exemplary object layer helpful in demonstrating embodiments of the invention.

Reference is now made to FIG. 1B, which illustrate an exemplary object layer and scanning plans thereof, helpful in demonstrating embodiments of the invention. An exemplary layer 105 may include one or more imaged areas corresponding to a cross section of the object to be printed, also referred to herein as "elements" and non-images areas complementing the imaged areas.

For example, as is shown in FIG. 1B, elements of the object layer to be fabricated may be spaced from one another. For example, layer 105 may include five imaged areas 105a, 105b, 105c, 105d and 105e, each of which is spaced from the other elements. Layer 105 may be printed according to a predesigned scanning plan. According to embodiments of the invention, the scanning plan may be designed such that the accumulated time required to deposit material to create the layer is minimized. The scanning plan may be generated based on the content of the imaged data associated with the layer and may be customized based on the unique characterization of the layer including the locations of the imaged areas, their number and their size.

According to embodiments of the invention, a method of building a three-dimensional object may include generating scanning plans for the layers such that the accumulated length of all passes in a given layer is minimized. A scanning plan may define the starting position of the printing head along the indexing direction for each pass and the starting position and end position of the printing head in the scanning direction, as to obtain the shortest accumulated way or length that printing head 130 may pass through all passes in given layer and accordingly a shorter printing time.

The printing time for a layer may be calculated from by the following formula:

$$X_{accum}/V + n*T_{OH} \quad [1]$$

where $X_{accum}/V$ is the accumulated period of time where the printing head moves in the X direction which is termed inhere as accumulated printing time, $X_{accum}$ represents the accumulated length of the way made by printing head 130 during all passes and V is the speed of movement printing head 130 along the X axis. The expression $n*T_{OH}$ represents the accumulated overhead time where n represents the number of passes in a layer of an object and $T_{OH}$ represents a constant overhead time associated with a single pass.

The overhead time may include, for example, time required to move the printing head and other printing component, such as the leveling apparatus, curing units and the like outside the area defined by the building bitmap, an acceleration and deceleration time in the X direction and the time in which the printing head is indexed, namely moved in the Y direction between passes. The overhead time may be considered as approximately constant for all passes of a layer. It should be understood that if the accumulated printing time is small relative to the accumulated overhead time, it may be desired to minimize the number of scanning passes by determining unconventional starting positions for the scanning passes.

As shown in the exemplary illustration of FIG. 1B, layer 105 is formed by dispensing material based on a scanning plan that includes nine scanning passes. Each pass has a pre-defined length based on the content of the image data associated with the scanning pass. The scanning plan may include instructions defining the start and end position of the printing head for each scanning pass. The start and end position may be selected to minimize the accumulated printing time and overhead time as defined above. In the exemplary illustration of FIG. 1B, printing head 130 performs a first pass 12a to deposit material on the upper part of element 105a starting from location "A". Then, the printing head moves to position "B" to perform a second pass 12b while deposing material on the lower part of element 105b. In this case, the distance between positions "A" and "B" is equivalent to the size or effective size of the printing head defined by the distance between nozzles located at both ends of the printing head along the longitudinal axis.

As element 105b is spaced from element 105a, the printing head moves a distance larger than the size of the head to start position "C" and then performs another scanning pass 12c depositing material on imaged area 105b. Following are passes 12d and 12e corresponding to imaged area 105c. As illustrated, first the printing head is moved to starting position "D" in order to perform a short scanning pass 12d to deposit material on the upper portion of element 105c and then the head is moved to starting position "E" to perform a longer scanning pass 12e while depositing material in the lower portion of element 105c. The distance between positions "D" and "E" is equivalent to the size of the printing head.

Next, the printing head is moved, in the indexing direction Y, to a subsequent starting position "F" to form imaged area 105d by three scanning passes 12f, 12g and 12h. Imaged area 105d is divided, for ease of explanation into three areas, 105f, 105g and 105h. Starting at location "F", printing head performs a first, relatively long, scanning pass depositing material on section 105f. Then, the printing head is moved in the indexing direction Y, a distance that is smaller than the distance between the edge nozzles to position "G". From starting position "G", the printing head performs a short scanning pass 12g depositing material on imaged area 105g.

It should be noted that scanning pass 12g partially overlaps scanning pass 12f but nozzles related to the overlapping portion do not deposit material during the second pass (scanning pass 12g). Next, the printing head is moved in the indexing direction Y, a distance that is smaller than the distance between the edge nozzles to position "H". From starting position "H", the printing head performs another relatively long scanning pass 12h depositing material on imaged area 105h. It should be noted that scanning pass 12h partially overlaps scanning pass 12g but nozzles related to the overlapping portion do not deposit material in scanning pass 12h. By generating the scanning plan described above and allowing partial overlap between scanning passes, the accumulated printing length becomes shorter than an accumulated length of non-over lapping passes that would result in three equally sized scanning passes.

Lastly, the printing head performs a relatively short scanning pass 12i to deposit material on element 105e starting from location "I". In this case, the starting position "I" is offset from the previous starting position "H" in both the X and Y directions.

Figure 2A:
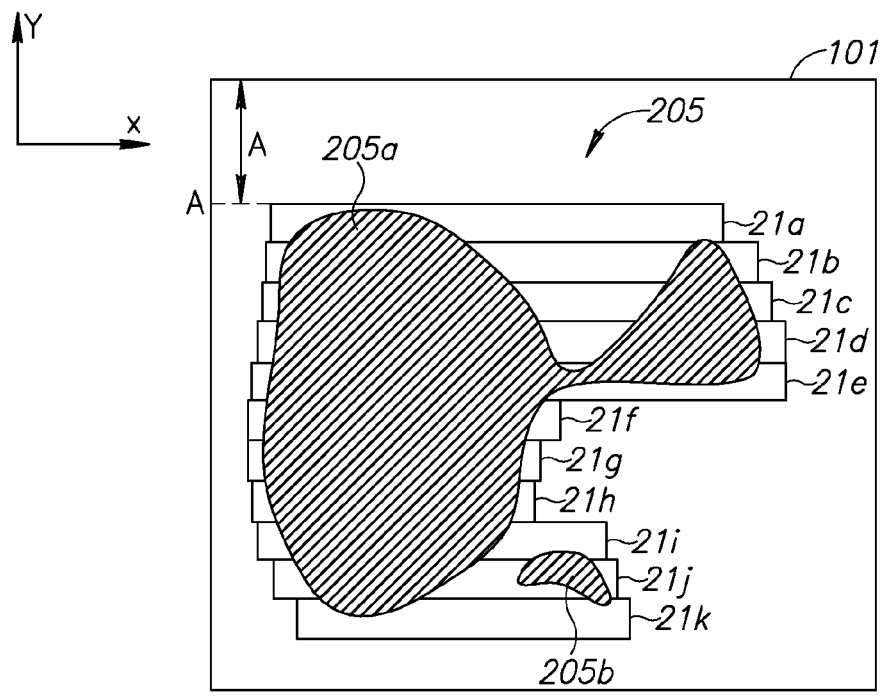
FIGS. 2A-2B are illustrations of scanning plans of another exemplary object layer helpful in demonstrating embodiments of the invention.
Figure 2B:
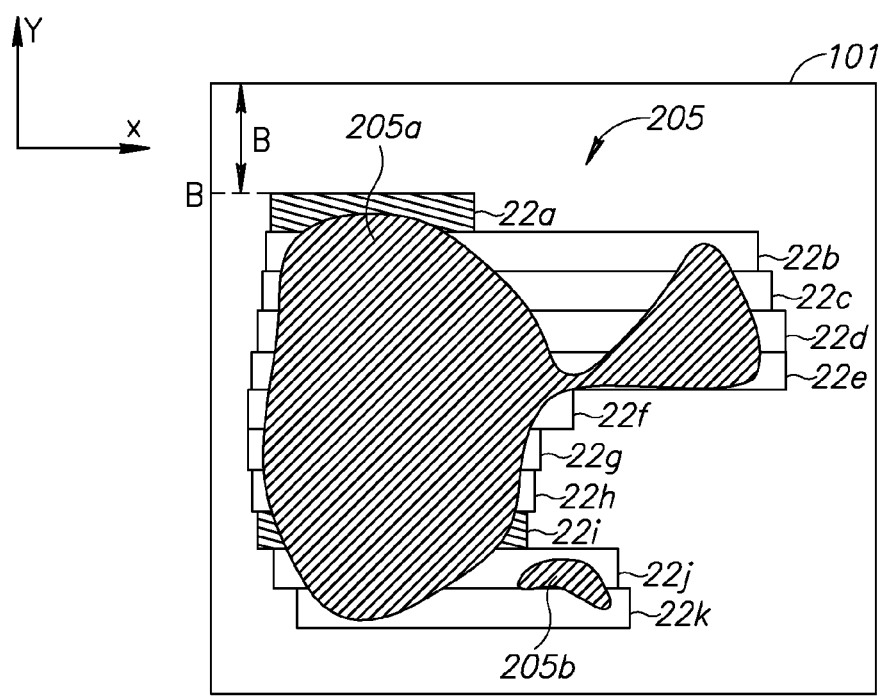

FIGS. 2A and 2B are illustrations of another exemplary object layer and scanning plans thereof, helpful in demonstrating embodiments of the invention. Object layer 205 may include two imaged areas 205a and 205b. As illustrated in FIGS. 2A and 2B, eleven adjacent scanning passes (passes 21a-21k of FIG. 2A or 22a-22k of FIG. 2B) are required to deposit material on the entirety of imaged area 205a. By moving the starting position of the first scanning pass from position "A" for scanning pass 21a in FIG. 2A to position "B" for scanning pass 22a in FIG. 2B, the accumulated printing length required to form the layer 205 is minimized. In particular, for this exemplary illustration, the first and ninth scanning passes are shortened by an optimized choice of the starting position. The optimized starting position is at location B and not and location A which is more closed to the upper left portion of element 205a.

Figure 3A:
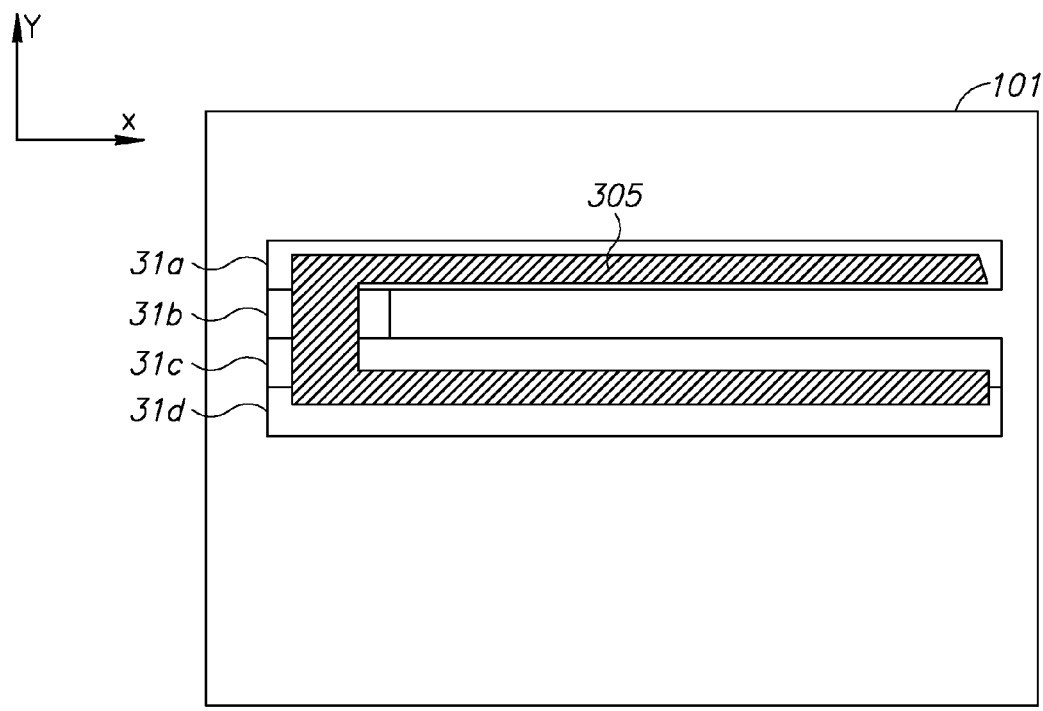
FIGS. 3A and 3B are illustrations of scanning plans of an exemplary object layer according to embodiments of the invention.
Figure 3B:
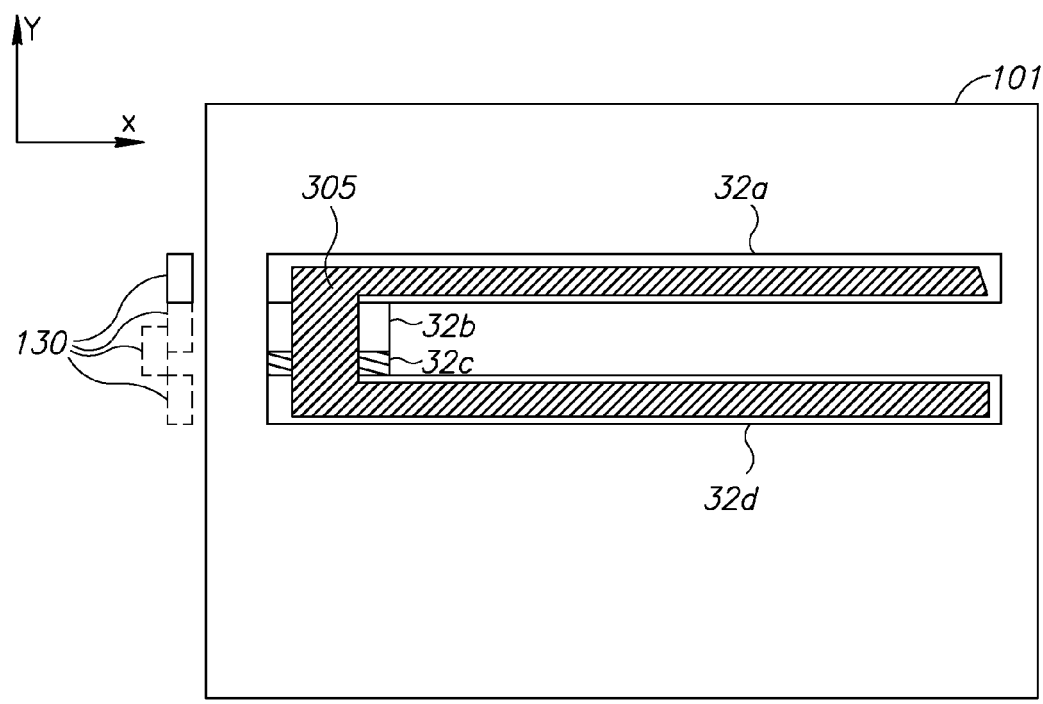

FIGS. 3A and 3B are illustrations of another exemplary object layer and scanning plans thereof, according to embodiments of the invention. As shown by the exemplary scanning plan illustrated in FIG. 3A, four scanning passes are required to deposit material on an imaged area 305. By generating the optimized scanning plan of FIG. 3B, both the second and third scanning passes are short and accordingly the accumulated printing length becomes shorter than the scanning plan of FIG. 3A. According to the scanning plan of FIG. 3A, the printing head is re-positioned in the indexing direction before starting the next scanning pass such that the distance between starting positions of subsequent passes equals to the size of the printing head. Therefore, subsequent passes according to the scanning plan of FIG. 3a do not overlap each other resulting in three relatively long passes (31a, 31c and 31d) and one relatively short scanning pass (31b).

According to embodiments of the present invention, the scanning plan for element 305 (scanning passes 32a-d) may be designed to optimize the plan by minimizing the accumulated printing length. As illustrated in FIG. 3B, in order to minimize the third pass, the scanning plan may include an overlap between scanning pass 32c and scanning pass 32b. It should be, however, understood to a person skilled in the art that the overlap between passes is related only to positioning of printing head 130 in the Y axis such that the distance between starting positions of subsequent passes is smaller than the size of the printing head. Such an overlapping is not related to dispensing material more that once on the same area. According to embodiments of the invention, the nozzles are controlled in such as way as to ensure that material is dispensed only once in each spot of the layer.

According to embodiments of the invention, the scanning plan may be customized, for each imaged area or element of the object layer and in addition the scanning plan may be customized or adapted for each layer of the object being printed. For example, the X-Y cross section of an object may be different when moving along the Z axis and accordingly, it may be desirable to perform updated optimization calculations for subsequent layers when the cross section changes. Customizing the scanning plan for a plurality of layers of an object may include compensation schemes for mal-functioning nozzles in consecutive layers using techniques like random scattering. Although the invention is not limited in this respect, random scattering allows random selection of the start position of the printing head in the indexing direction between upper and lower boundaries for successive layers. These boundaries are determined based on the number of scanning passes, the number of nozzles along the indexing direction and the resolution of the printing head, and the size of the imaged area along the indexing direction. The random selection of the printing head position within the nozzle shift boundaries ensures that different nozzles would print the same line in the X direction when moving in the Z direction between different layers. Such a printing plan ensures that if there is a mal-functioning nozzle, the pixel above the pixel that did not receive material due to the malfunctioning nozzle would receive material from another nozzle at the next layer.

Although the invention is not limited in this respect, the changes in image data between two consecutive layers may be mild, due to the small thickness of each layer and therefore re-optimization and re-planning or customizing of the scanning plan may be performed once every number of layers. Further, it should be noted that as the content of a lower layer does not expend but rather tend to shrink, a scanning plan of the lower layer would cover the subsequent layer as well. Occasionally, the changes in image data between two consecutive layers may be abrupt. For example, printing a subsequent layer with a substantially smaller number of scanning passes without further adjustment may cause evident defects on the surface of the three-dimensional object (faint step). The defects are caused by a smaller exposure time to curing of the layer which required a smaller number of scanning passes. According to embodiments of the invention, in order to prevent such defects the scanning plan may include a graduate adjustment over a pre-defined number of subsequent layers. The adjustment mechanism may artificially lengthen the time required to form the layers and gradually reduced the additional time by moving the printing head outside the area defined by the building bitmap and waiting for a certain period of time prior to continuing with depositing material according to the original scanning plan.

Embodiments of the present invention may include generating a scanning plan that includes independent nozzle scattering schemes for different sections of the 3D object to compensate for malfunctioning nozzles and to ensure good quality. According to the scanning plan, the method may include depositing material from a printing head, in subsequent layers, to build a first three dimensional section of the object by randomly re-positioning for each of the layers the start positing of the printing head in the indexing direction within a first range and depositing material from the printing head, in the same subsequent layers, to build a second three dimensional section of the object, separated from the first section by non-imaged section by randomly re-positioning for each of the layers the start positing of the printing head in the indexing direction within a second range, wherein the second range is different than the first range.

Reference is now made to FIGS. 4A-4D, which are illustrations of scanning plans that includes nozzle shift compensation schemes of an exemplary three-dimensional object helpful in understanding embodiments of the present invention. Embodiments of the invention may include generating a scanning plan that incorporates nozzle shift compensation scheme for malfunctioning nozzles, using for example, nozzle scattering techniques. The nozzle shift scheme along the indexing direction for consecutive layers may be planned independently for two or more spaced imaged sections separated by non-imaged sections. Each imaged area may be associated with an upper position in the indexing direction located above the imaged area and a lower position in the indexing direction located below the imaged area together indicating the boundaries between which the printing head may be positioned when that imaged section is printed. The selection of upper and lower boundaries for each imaged area defines a unique range in the Y direction for positioning of the printing head for the purpose of nozzle scattering. Nozzle scattering ensures that different nozzles would print the same line in the X direction when moving in the Z direction between different layers. Such a printing plan ensures that if there is a mal-functioning nozzle, the pixel above the pixel that did not receive material due to the mal-functioning nozzle would receive material from another nozzle at the next layer.

Figure 4A:
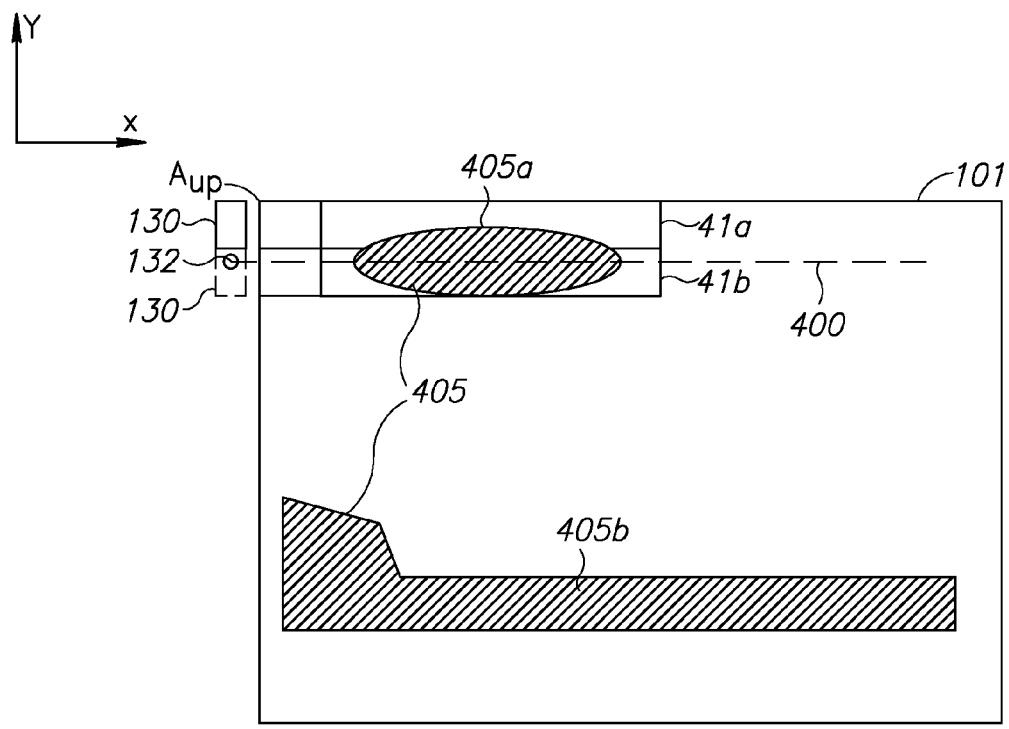
FIGS. 4A-4D are illustrations of scanning plans of an exemplary object layer according to embodiments of the invention.
Figure 4B:
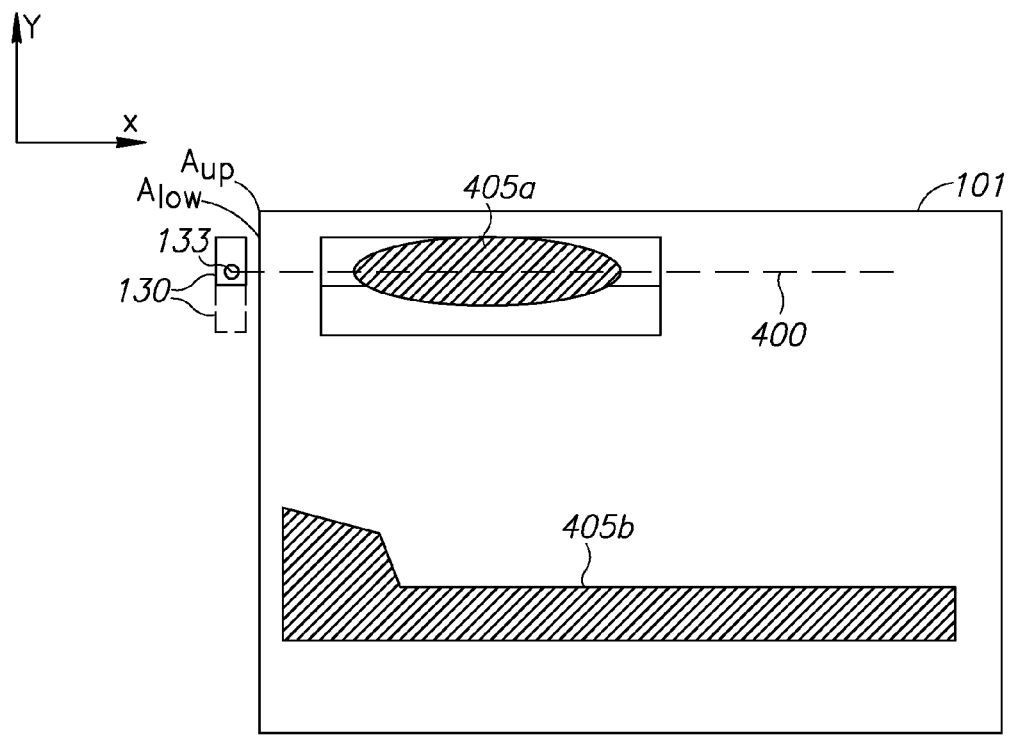
Figure 4C:
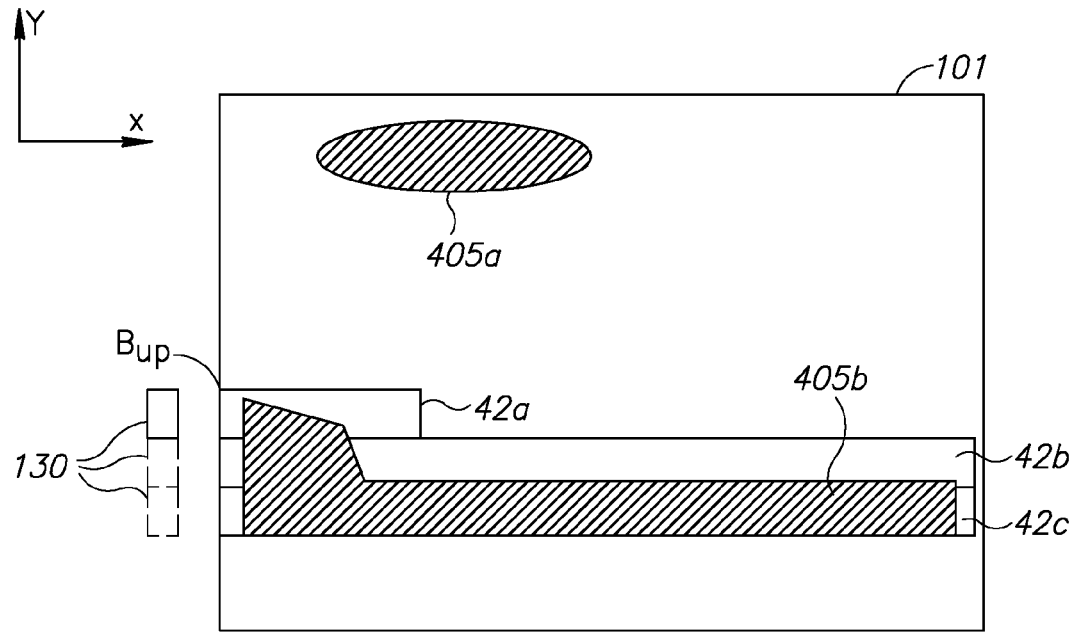
Figure 4D:
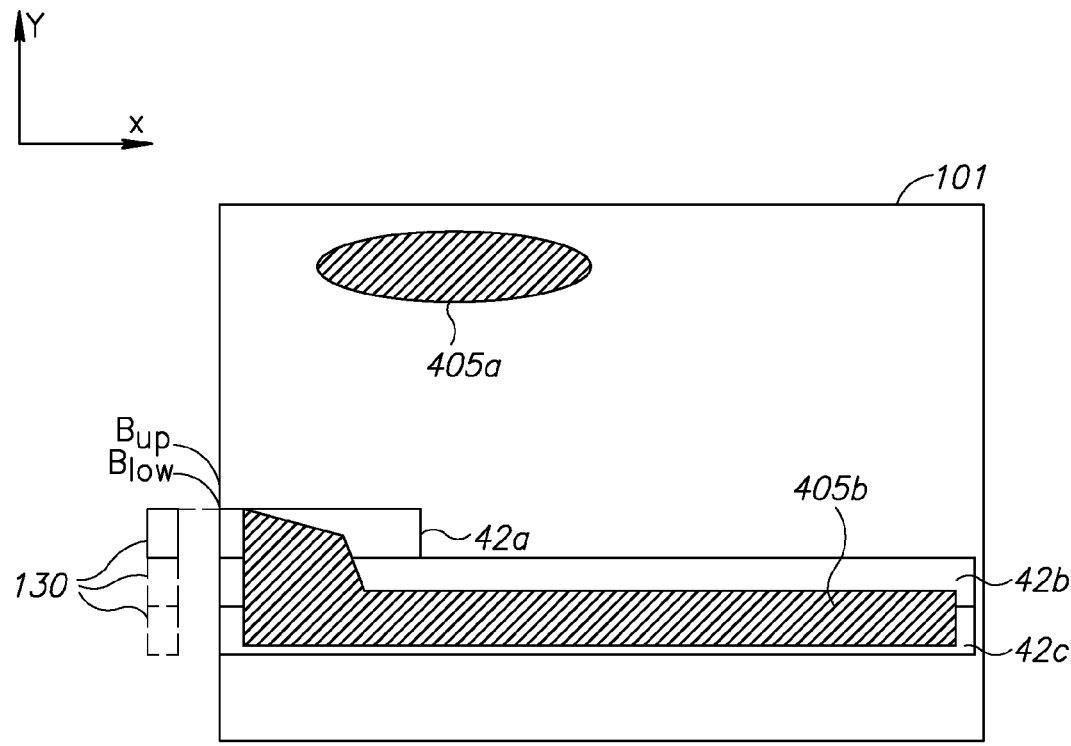

FIGS. 4A-4D illustrate a cross section in the X-Y plane of an exemplary 3D object to be printed. The illustrated cross section includes a first imaged area 405a having an elliptical shape and a second imaged area 405b having an elongated shape and separated from imaged area 405a by a non-imaged area. FIGS. 4A and 4B represent scanning plans for elliptical imaged area 405a that include an independent nozzle shift scheme for imaged area 405a while FIGS. 4C and 4D represent scanning plans for elongated imaged area 405b that include an independent nozzle shift scheme for imaged area 405b.

The scanning plan for imaged area 405b includes three scanning passes 42a, 42b and 42c, each having a width equal to the effective size of the printing head. FIG. 4C illustrates the case in which printing head 130 is positioned for performing scanning pass 42a at an upper boundary Bup and FIG. 4D illustrates the case in which printing head 130 is positioned for performing scanning pass 42a at upper boundary Blow. It should be understood to a person skilled in the art that for each layer the position of printing head in the indexing position for performing pass 42a may be randomly shifted between boundary positions Blow and Bup in a range defined by these boundaries. The difference between the width in the Y direction of imaged area 405b and three-times the size of the printing head and the value of a predetermined quantum shift $\Delta Y$ determine the number of possible start positions that may be randomly selected in a nozzle shift scheme customized for imaging imaged areas 405b.

The scanning plan for imaged area 405b includes three scanning passes 42a, 42b and 41c, each having a width equal to the effective size of the printing head. FIG. 4C illustrates the case in which printing head 130 is positioned for performing scanning pass 42a at an upper boundary $B_{up}$ and FIG. 4D illustrates the case in which printing head 130 is positioned for performing scanning pass 42a at upper boundary $B_{low}$. It should be understood to a person skilled in the art that for each layer the position of printing head in the indexing position for performing pass 42a may be randomly shifted between boundary positions $B_{low}$ and $B_{up}$ in a range defined by these boundaries. The difference between the width in the Y direction of imaged area 405b and three-times the size of the printing head and the value of a predetermined quantum shift ΔY determine the number of possible start positions that may be randomly selected in a nozzle shift scheme customized for imaging imaged areas 405b.

According to embodiments of the invention, as illustrated by FIGS. 4A-4D, a customized independent nozzle shift scheme to compensate for mal-functioning nozzles for separated imaged areas of the 3D object is enabled. For the exemplary 3D object of FIGS. 4A-4D, the number of possibilities, within the range defined by boundaries $A_{low}$ and $A_{up}$ of imaged area 405a, to re-position the printing head 130 in the indexing direction Y for performing scanning pass 41a would be larger than the number of possibilities, within the range defined by boundaries $B_{low}$ and $B_{up}$ of imaged area 405b, to re-position the printing head 130 in the indexing direction Y for performing scanning pass 42a.

The nozzle shift of the printing head in the indexing direction for successive layers may result in depositing material on a specific line of pixels in the X direction by different nozzles for different successive layers. For example, a specific line of pixels in the X direction within different layers may receive material deposited by different nozzles as the printing head is shift in the Y direction before starting the formation of a subsequent layer. Scanning the same areas on successive layers by different nozzles may improve the quality of the 3D object as some of the nozzles may be defective or malfunctioning. For example, line 400 in a first layer may be printed by nozzle 132 and the same line may be printed by nozzle 133 in another layer.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method for printing three-dimensional objects, layer by layer, the method comprising:
    automatically generating a pre-designed scanning plan for printing a layer of a three dimensional object in two or more scanning passes by a relative movement in a scanning direction of a printing head and a printing tray, where the pre-designed scanning plan includes a start position, and each of the scanning passes is assigned a respective length determined based on image data parameters of the layer;
    performing, by a computing device, an optimization scheme to determine the start position of the pre-designed scanning plan so as to minimize an accumulated length of all lengths of the scanning passes; and
    selectively depositing material from the printing head according to the pre-designed scanning plan to form the layer.

2. A method for printing three-dimensional objects, layer by layer, the method comprising:
    generating a pre-designed scanning plan for printing a layer of a three dimensional object in two or more scanning passes by a relative movement in a scanning direction of a printing head and a printing tray; and
    selectively depositing material from the printing head, based on the pre-designed scanning plan, such that a first scanning pass forms a first imaged area on the layer and a second scanning pass forms a second imaged area on the layer, where the second scanning pass partially overlaps the first scanning pass and the first and second imaged areas do not overlap.

3. The method of claim 2, wherein the printing head comprises a plurality of nozzles along a longitudinal axis of the printing head, a distance between nozzles located at both ends of the printing head along the longitudinal axis defines printing head size and selectively depositing comprises:
    positioning the printing head in a first position such that the longitudinal axis of the printing head is substantially parallel to an indexing direction, the indexing direction being perpendicular to the scanning direction;
    generating a relative movement between the printing head and a fabrication tray along a scanning direction in the first scanning pass, substantially perpendicular to the indexing direction while selectively dispensing material from the printing head to form the first imaged area;
    re-positioning the printing head in a second position, the second position being offset along the indexing direction from the first position by a distance that is smaller than a size of the printing head; and
    generating a relative movement between the printing head and a fabrication tray along the scanning direction in the second scanning pass, while selectively dispensing from a printing head material to form the second imaged area.

4. The method of claim 3, wherein a first length of the first scanning pass is different than a second length of the second scanning pass.

5. The method of claim 3, wherein a start position in the scanning direction for the first scanning pass is different than the start position in the scanning direction for the second scanning pass.

6. A method for printing three-dimensional objects, layer by layer, the method comprising:
    generating a pre-designed scanning plan for printing a layer of a three dimensional object in two or more scanning passes by a relative movement in a scanning direction of a printing head and a printing tray, wherein the layer comprises first and second imaged areas separated from each other by a non-imaged area;
    selectively depositing material from the printing head according to the pre-designed scanning plan to form the layer;
    for each of a plurality of subsequent layers:
        prior to depositing material on the first imaged area, re-positioning, within a first range, a start position of the printing head in an indexing direction, the indexing direction being perpendicular to the scanning direction; and
        prior to depositing material on the second imaged area, re-positioning the start position of the printing head in the indexing direction within a second range, wherein the second range is different than the first range.

7. The method of claim 6, wherein re-positioning comprises randomly re-positioning the start position of the printing head within the first range and randomly re-positioning the start position of the printing head within the second range.

8. The method of claim 6, wherein re-positioning comprises re-positioning the start positions of the printing head in of the first and second ranges independently from each other.

9. The method of claim 7, wherein re-positioning the printing head within the first or second range is to compensate for mal-functioning nozzles.

10. An article comprising a computer-storage medium having stored thereon instructions that, when executed by a processing platform, result in:

generating a pre-designed scanning plan for printing a layer of a three dimensional object in two or more scanning passes by a relative movement in a scanning direction of a printing head and a printing tray; and selectively depositing material from the printing head, based on the pre-designed scanning plan, such that a first scanning pass forms a first imaged area on the layer and a second scanning pass forms a second imaged area on the layer, where the second scanning pass partially overlaps the first scanning pass and the first and second imaged areas do not overlap.

11. A method for printing a three-dimensional object, layer by layer, the method comprising:

selectively depositing material from a printing head in two or more scanning passes to form a layer of the three-dimensional object, wherein a first group comprised of at least one of the scanning passes forms a first imaged area on the layer and a second group comprised of at least one of the scanning passes forms a second imaged area on the layer such that the second imaged area is separated from the first imaged area by a non-imaged area;

for each of a plurality of subsequent layers:

prior to depositing material on the first imaged area, re-positioning, within a first range, a start position of the printing head in an indexing direction, the indexing direction being perpendicular to a scanning direction; and prior to depositing material on the second imaged area, re-positioning the start position of the printing head in the indexing direction within a second range, wherein the second range is different than the first range.

12. The method of claim 11, wherein re-positioning comprises randomly re-positioning the start position of the printing head within the first range and randomly re-positioning the start position of the printing head within the second range.

13. The method of claim 11, wherein re-positioning comprises re-positioning the start positions of the printing head within the first and second ranges independently from each other.

14. The method of claim 11, wherein re-positioning the printing head within the first or second range is to compensate for mal-functioning nozzles.

* * * * *